J. R. GAMMETER.
BEAD PLACING RING.
APPLICATION FILED FEB. 2, 1911.
1,164,804.
Patented Dec. 21, 1915.
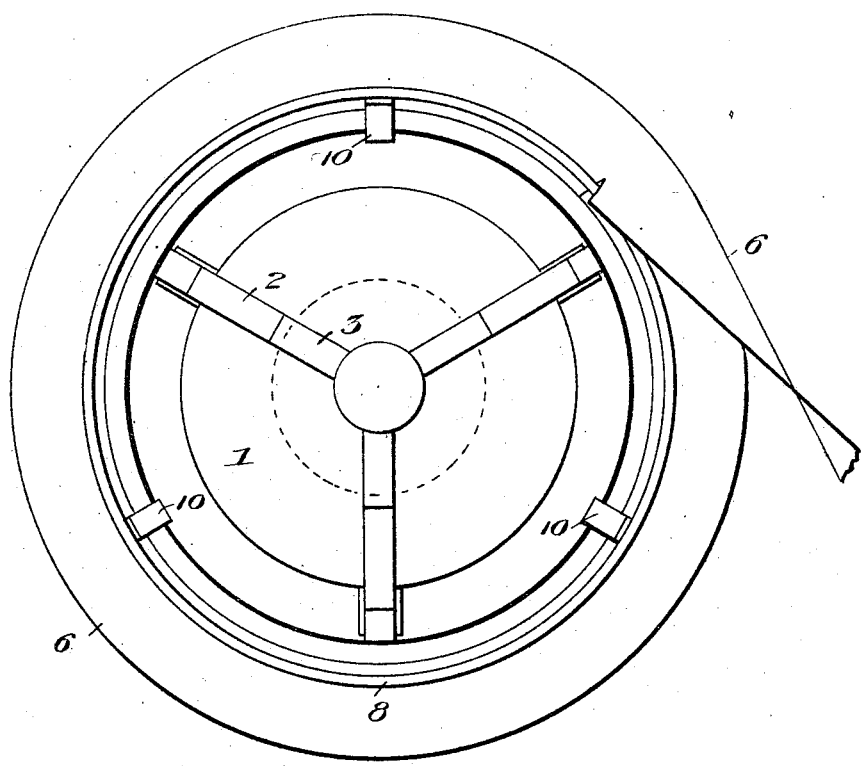
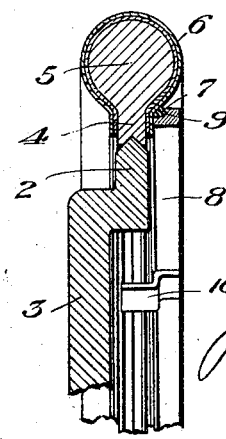

UNITED STATES PATENT OFFICE.

JOHN R. GAMMETER, OF AKRON, OHIO, ASSIGNOR, BY MESNE ASSIGNMENTS, TO THE B. F. GOODRICH COMPANY, A CORPORATION OF NEW YORK.

BEAD-PLACING RING.

1,164,804.   Specification of Letters Patent.   Patented Dec. 21, 1915.

Original application filed December 2, 1909, Serial No. 531,045. Divided and this application filed February 2, 1911. Serial No. 606,090.

*To all whom it may concern:*

Be it known that I, JOHN R. GAMMETER, a citizen of the United States, residing at Akron, county of Summit, and State of Ohio, have invented certain new and useful Improvements in Bead-Placing Rings, of which the following is a specification.

My invention relates to the making of tires composed of fabric and rubber, and more particularly to the making of the outer casings or shoes of pneumatic tires. Tires of this nature, and particularly the larger sizes thereof, designed for use on heavy motor vehicles, commonly comprise a main body portion composed of a number of layers of fabric laid one upon another and held together by a suitable binder, usually of rubber gum with which the fabric is impregnated, beads secured to the inner edges of the body portion for securing the tire to the rim and an outer tread surface of soft rubber.

The beads may be made of fabric and rubber, partly vulcanized rubber, braided wire, or other suitable material, and are preferably applied to the tire after a part of the layers of fabric, say three or four, have been formed into the tire, the remaining layers of fabric being applied over the beads and taking the form thereof. It is important that these beads be accurately centered with relation to the tire, and my invention embraces means for doing this and for facilitating the operation of securing them in place. It has heretofore been common practice to form these beads in long strips and apply them around the inner circumference of the tire by hand, this operation requiring much care and skill in order to secure proper location of the beads. It has also been attempted in certain forms of tire-making machines to apply the bead strip by means of rollers, gradually rolling the strip down upon the edges of the tire as the same was revolved upon a core. This, however, is a more or less difficult operation and requires careful splicing of the bead strip at the ends thereof. Moreover, it cannot be used in applying certain forms of beads, such as the partly vulcanized beads, which are preferably shaped into annular form before vulcanizing, and must be applied in such form. By my invention I use an annular ring or form which I locate in some definite manner with relation to the core upon which the tire is built up, using this ring or form to insure the proper location of the bead. I preferably secure the bead to the ring or form before locating the same with reference to the core, then apply the ring carrying the bead to the core, properly locating the same and moving the ring and bead carried thereby into engagement with the tire upon the core. The bead will then adhere to the tire and the ring may be removed, leaving the bead secured to the tire in the desired position.

In the accompanying drawings which form a part of this specification, Figure 1 is a side elevation showing the chuck of a tire-making machine, having mounted thereon a tire-forming core or mold with a partially formed tire thereon, a bead-carrying ring being shown located in position to apply a bead to the tire. Fig. 2 is a transverse section through the core, partially formed tire thereon, bead ring and bead, and one of the arms of the chuck.

In these drawings I have shown for purposes of illustration one specific embodiment of my improved means for applying beads, but I do not wish to be limited to the exact construction set forth, as the principles of my invention may be embodied in many different forms of apparatus.

Referring to the drawings in detail, the numeral 1 designates a chuck, preferably rotatably supported in any suitable manner, as by being mounted on the rotatable shaft (not shown) of a tire-making machine. This chuck is provided with arms 2, sliding in grooves 3 in the face of the chuck, the ends of the arms being preferably V-shaped and engaging within a V-shaped groove cut in the inner face of the inwardly projecting flange 4 of the core or mold 5. The chuck may be of any usual or well-known construction, such as that of the chucks commonly used for holding work upon turning lathes, in which by use of a suitable key or wrench appropriate mechanism within the chuck may be operated to simultaneously force outwardly or contract all of the arms 2. By these means the core 5 may be mounted upon or detached from the chuck, the proper centering of the core with reference to the chuck being insured. It is deemed unnecessary to illustrate the mechanism of this chuck in detail as any of the well-known constructions adapted to the purpose may be used.

The tire is formed upon the mold or core by winding thereon the rubber impregnated fabric 6, which may be drawn from a stockroll or other suitable source of supply. After a certain number of layers of fabric have been applied to the core, for example, two layers as shown in Fig. 2, the partially formed tire is ready for the application of the bead 7. This I accomplish in the following manner: I provide a ring 8, having a groove or annular recess 9 formed therein, in which I place the bead 7 in annular form. This groove or annular recess 9 formed in the inner lateral face of the ring 8 has a contour conforming to that which it is desired to have the finished bead present upon its outer faces. To this end the recess is sufficiently undercut to afford an overhanging projection adapted to bear on the upper side of the bead. The ring 8 is provided with some means for centering the same with reference to the tire. In the embodiment of my invention shown, these means comprise the shouldered brackets or arms 10, secured at their outer ends to the ring, the inner ends of the latter being adapted to slide within the inner face of the core or mold 5. Three of these arms are preferably used, they being adapted to fit closely within the core. It will be seen that by inserting these arms within the core and moving the ring toward the same, the bead 7 will be brought in contact with the partially formed tire and accurately centered with relation to the same. The tire being sticky, and usually the bead also, the latter will firmly adhere to the tire in the desired position. Pressure is then exerted on the outer side of the ring 8, forcing the ring and bead held thereby against the tire. This pressure may be applied by any suitable means, preferably by hammer blows at equidistant points about the ring. The ring thus serves by means of the two-sided annular groove for the reception of the outer edge or corner of the bead to support the bead both on the side thereof nearest its axis and on the side thereof remote from its axis, and uniformly to compress the bead while maintaining its circularity, and to fasten it to the tire without the steps hitherto commonly employed with bead-carrying rings, consisting in spading and hammering down the bead or rolling it. The ring 8 can then be readily removed, leaving the bead in position upon the tire. The bead upon the other side of the tire can be applied in the same manner. The tire may then be completed by winding additional layers of fabric about the same, and rolling the fabric down over the bead in any suitable manner, after which a rubber tread may be applied and the tire vulcanized.

Having thus described my invention, I claim—

1. A bead carrying ring having an annular groove in one lateral face, and a plurality of arms projecting laterally beyond said face.

2. A bead-carrying ring having a two-sided annular groove for the reception of the outer edge or corner of the bead, and means on said ring for centering the same on a tire core.

3. A bead-carrying ring having an annular surface adapted to support the bead on the side thereof nearest its axis, and another annular surface adapted to support said bead on the side thereof remote from its axis, the said two surfaces having an angular relation in cross-section so as to accommodate the outer corner or edge of the bead and form an abutment whereby pressure may be exerted on the bead by means of said ring to cause the bead to adhere firmly to the tire.

JOHN R. GAMMETER.

Witnesses:
  EDMUND QUINCY MOSES,
  WALTER K. MEANS.